United States Patent
Ishikawa

(10) Patent No.: US 6,235,189 B1
(45) Date of Patent: May 22, 2001

(54) METHOD OF SUPPLYING DISSOLVED CARBON DIOXIDE TO PLANTS IN AN AQUEOUS MEDIUM

(75) Inventor: Yoichi Ishikawa, Tokyo (JP)

(73) Assignee: Able Corporation, Tokyo (JP)

( * ) Notice: Subject to any disclaimer, the term of this patent is extended or adjusted under 35 U.S.C. 154(b) by 0 days.

(21) Appl. No.: 08/353,791

(22) Filed: Dec. 9, 1994

Related U.S. Application Data

(63) Continuation of application No. 08/126,244, filed on Sep. 23, 1993, now abandoned.

(30) Foreign Application Priority Data

Sep. 24, 1992 (JP) .................................................. 4-296273
Apr. 26, 1993 (JP) .................................................. 5-133797

(51) Int. Cl.[7] .................................................. C02F 1/461
(52) U.S. Cl. ........................... 205/753; 205/751; 205/759
(58) Field of Search .................................... 204/101, 149, 204/151, 152, 283, 252, 249, 272, 284; 205/687, 742, 555, 751, 753, 759, 746

(56) References Cited

U.S. PATENT DOCUMENTS 4,360,417   11/1982   Reger et al. .
4,369,104   1/1983    Beckley .
5,256,268 * 10/1993   Goto et al. ........................... 204/268

FOREIGN PATENT DOCUMENTS 1 578 756   11/1980   (GB) .

OTHER PUBLICATIONS

Grant, Hackh's Chemical Dictionary, 4th edition, p. 448, nascent, 1960, No Month Available.*

* cited by examiner

Primary Examiner—Kathryn Gorgos
(74) Attorney, Agent, or Firm—Flynn, Thiel, Boutell & Tanis, P.C.

(57) ABSTRACT

The invention provides a method of supplying dissolved carbon dioxide to plants in an aqueous medium characterized by electrolyzing the water in the aqueous medium by electrodes disposed in the aqueous medium and supplied with electric current. At least one of the electrodes is a carbon electrode which acts as a positive electrode. The current density is supplied to the electrodes at or below the level at which no, or substantially no, gaseous oxygen is formed at the positive carbon electrode.

8 Claims, 3 Drawing Sheets

METHOD OF SUPPLYING DISSOLVED CARBON DIOXIDE TO PLANTS IN AN AQUEOUS MEDIUM

This application is a continuation of U.S. Ser. No. 08/126,244, filed Sep. 23, 1993, now abandoned.

BACKGROUND OF THE INVENTION

The present invention is concerned with an apparatus and method of supplying carbon dioxide dissolved in water. More particularly, the invention is concerned with the supply to plants in water, cultivating mediums for cells of animals and plants, potable water, etc., with carbon dioxide dissolved in water.

Systems which should be continuously supplied with a dissolved carbon dioxide in water include those involved with photosynthesis in plants and cultivation of cells of animals. For this purpose, conventionally, a gas source from outside, such as a bomb of carbon dioxide, is used and contacting of the gas with a liquid forms dissolved carbon dioxide therein. In this method, however, the gas-feeding rate can be controlled only by the contacting area of gas and liquid and the partial pressure of the carbon dioxide gas. Moreover, the bombs must constantly be replaced when they become empty. Maintenance is troublesome.

Aquatic plants living with ornamental fish are supplied with carbon dioxide gas by introducing carbon dioxide into a tube having the upper end closed and the lower end opening in the water so that water entering through the open end of the tube is brought into contact with the carbon dioxide gas contained in the tube, thus dissolving carbon dioxide gas in the water. The carbon dioxide gas must be introduced as frequently as about once per day, which is laborious. Furthermore, the carbon dioxide gas continues to be supplied even when there is no light to give rise to photosynthesis. Controlling the supply of carbon dioxide in this way is very difficult.

SUMMARY OF THE INVENTION

It is known that electrolysis of water using a positive carbon electrode produces oxygen gas which reacts with the carbon electrode and erodes it. For this reason, carbon electrodes are not used as anodes in the electrolysis of water. The present invention utilizes this disadvantage to provide an apparatus and method for supplying a controlled amount of dissolved carbon dioxide to an aqueous medium.

The invention provides an apparatus for supplying a controlled amount of carbon dioxide dissolved in water comprising supply means for supplying carbon dioxide and contact means for contacting the supplied carbon dioxide with water to effect dissolution of the carbon dioxide in the water, characterized in that the supply means together with the contact means are comprised of a carbon electrode in contact with the water and adapted, when connected together with a second electrode, also in contact with the water, to a source of direct electric current, to function as a positive electrode and in that control means are provided controlling the current density fed to the electrodes at or below the level at which no or substantially no oxygen gas is formed at said carbon electrode.

In a further embodiment, the invention provides an apparatus for supplying carbon dioxide gas dissolved in water in which the positive carbon electrode is covered with a hydrophilic water-permeable cover, which prevents carbon particles from dropping from the electrode during electrolysis and diffusing into the water.

The carbon electrode may be solid carbon, e.g., in the form of a rod. Preferably, the carbon electrode is a composite which comprises 30 to 70 percent by weight carbon and 70 to 30 percent of a material such as a ceramic, glass wool or a synthetic resin which is inert to carbon and electrolysis products. The inert material may be in the form of a skeleton or framework support which maintains the form of the electrode during use. The carbon may be in the form of particles, e.g., a powder, or may be in the form of granules preferably having a size of 2 mm or below. The electrode may also comprise a collecting member around which the electrode is formed.

The invention also provides a method of supplying dissolved carbon dioxide to an aqueous medium characterized by electrolyzing the water in the aqueous medium by means of electrodes disposed in the aqueous medium and supplied with electric current, at least one of the electrodes being a carbon electrode which acts as a positive electrode, and maintaining the current density supplied to the electrodes at or below the level at which no or substantially no gaseous oxygen is formed at the positive carbon electrode.

Oxygen is generated at the positive electrode by electrolysis of the water and then at least a part of the oxygen reacts with the carbon of the positive electrode to generate carbon dioxide. It has now been found that not only the amount of carbon dioxide generated but also the dissolved carbon dioxide supply rate can be controlled by adjusting the current density supplied to the electrodes for the electrolysis.

Hydrogen gas is generated at the negative electrode. In the event a cation in the aqueous medium happens to deposit on the negative electrode, it may be removed by reversing the polarity of the electrodes for a period from time to time.

Carbon is resistant to steam sterilization. Accordingly, it can be used in the cultivation of animal and plant cells in a culture.

The supply of dissolved carbon dioxide gas to an aqueous system effects a decrease in the pH value existing in the aqueous system. The invention can therefore be applied to control the pH in a culture during cell cultivation. Potable water also may be supplied with carbon dioxide gas.

The supply rate of the dissolved carbon dioxide is controlled by adjusting the current density supplied to the electrodes. At low current densities, the range of generation of oxygen at the carbon anode is also low so that substantially all the oxygen produced by electrolysis is able to react with the carbon of the anode to form carbon dioxide. As the current density is increased, the rate of generation of oxygen is also increased so that a point is reached when only a part of the oxygen generated at the carbon anode is able to react with the carbon of the electrode to form carbon dioxide. Under these circumstances, both dissolved carbon dioxide and oxygen gas are released from the carbon anode. The apparatus and method of the present invention do not contemplate an electrolysis in which substantial quantities of oxygen gas are produced at the carbon electrode.

Although, like the bomb of carbon dioxide gas used in the prior art, the carbon electrode is consumed, it can easily be replaced by fresh electrodes. Water plants in a 200 liter ornamental water tank require to be supplied with, in general, about 50 to 500 ml a day of carbon dioxide. This amount corresponds to 0.03 to 0.3 grams of carbon. In providing such a supply rate in the manner of the invention, it, therefore, will take more than 100 days to consume 30 g of carbon. This means that the rate of replacement of carbon anodes is much less than that necessary in the conventional case where bombs have to be replaced. Furthermore, the danger inherent in using high pressure equipment like a bomb, is not present.

The rate of generation of carbon dioxide depends in part on the current density and also depends on the form and type of carbon which is used to form the electrode. For a given form of carbon, the efficiency of carbon dioxide production increases to a maximum as the current density increases and then falls off somewhat as the current density is further increased. Thus, in the case of carbon black, the efficiency rises from a level of about 35 percent, at a current density of 1 mA, to a maximum of about 80 percent, at a current density of 6 mA, and falls again to about 60 percent, at a current density of 10 mA per sq. cm. of electrode surface. In general, amorphous forms of carbon, such as active carbon, are preferred.

The water is preferably circulated so as to constantly flow past the surface of the carbon electrode and convey dissolved carbon dioxide away from the surface of the carbon electrode.

BRIEF DESCRIPTION OF THE DRAWINGS

The invention will be further illustrated by reference to the accompanying drawings in which.

DETAILED DISCUSSION

Figure 1:
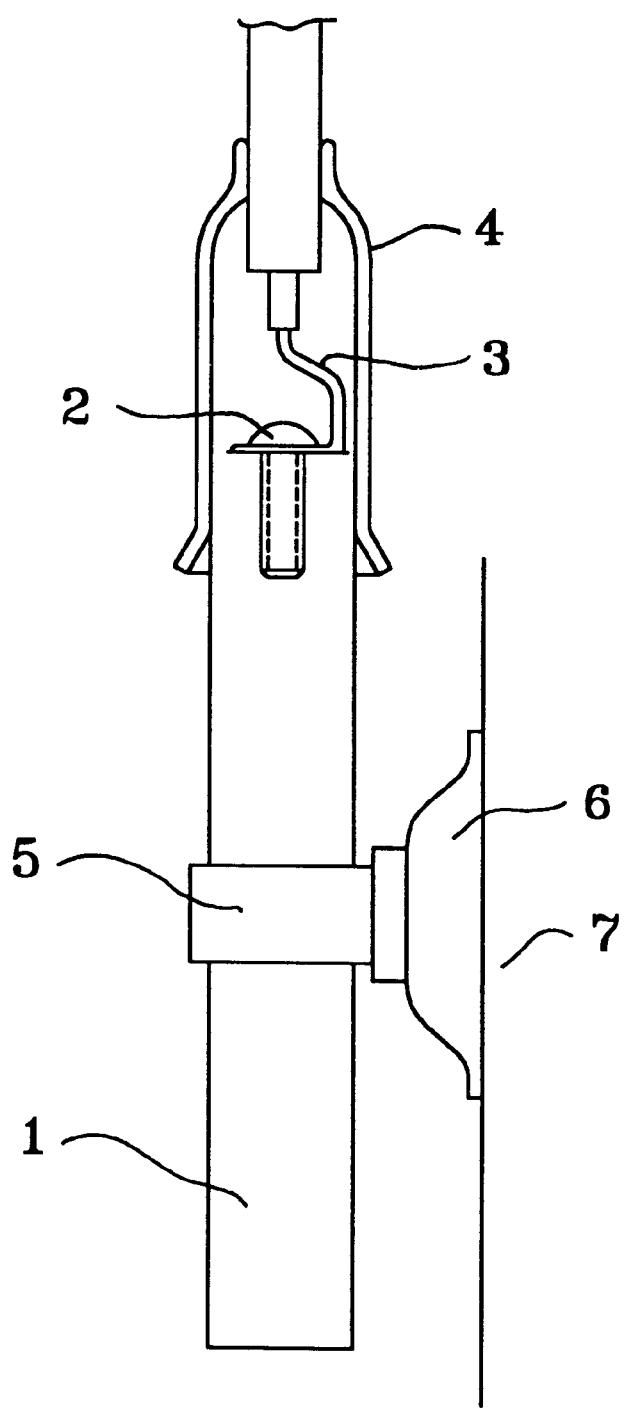
FIG. 1 shows a cross sectional view of Example 1 of the invention.

FIG. 1 shows a schematic cross sectional view of an apparatus according to the present invention for supplying dissolved carbon dioxide to aquatic plants. A cylindrical electrode of carbon 1 is connected to an electric lead 3 by a screw 2 and the connected part is sealed within a rubber cover 4. The electrode 1 is fixed onto the wall 7 of a water tank with a rubber band 5 and suction disk 6 integrated with said rubber band. Two of these electrodes 1 are disposed in water and connected to a source of electric current (not shown). Either direct or alternating current may be applied to the electrodes. The larger the current density, the greater the rate of generation of oxygen gas. The current density is adjusted to provide the described rate of oxygen formation. Various kinds of carbon, such as a bar of carbon and fibrous carbon, may be used. A carbon having a high resistance to oxidation, such as graphitized carbon, does not always suit the purpose of the present invention. A carbon bar having a diameter of 20 mm was partially immersed in city water to a depth of 100 mm, the weight of that part immersed in the water being about 50 g. The partially immersed carbon bar was used as the anode together with a second electrode as the cathode. A current density of 20 mA was applied to the electrodes. It was observed that a gas was generated at the negative electrode, but no gas appeared to be generated at the positive electrode. When the positive carbon electrode was replaced by a stainless steel electrode, a gas was seen to be generated at the stainless steel anode. It was evident that when the positive electrode was stainless steel, oxygen gas was generated but when the positive electrode was carbon, carbon dioxide was generated, not as a gas, but dissolved in the water surrounding and in contact with the carbon anode. At this current density with a solid carbon bar, the conversion efficiency (i.e., the percentage of oxygen produced at the anode which reacts with the carbon of the electrode to produce carbon dioxide) approaches 100 percent. If the water is circulated and the carbon electrode is placed in the circulating flow, the generated dissolved carbon dioxide is continuously removed from the vicinity of the carbon electrode and the current density may be increased to effect a higher rate of generation of oxygen and dissolved carbon dioxide.

Figure 2:
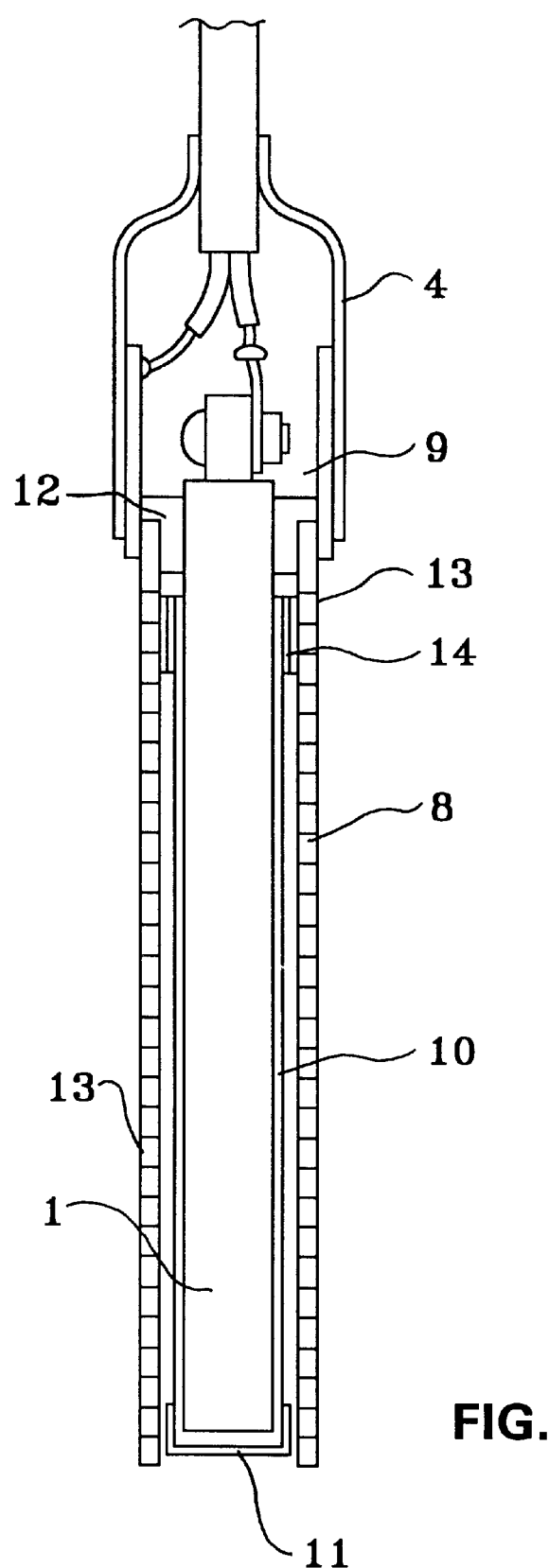
FIG. 2 shows a cross sectional view of Example 2 of the invention.

In FIG. 2, a schematic sectional view of a second embodiment of the invention is illustrated. If the positive carbon bar electrode of FIG. 1 is used for any length of time, carbon powder is formed and drops out of the electrode and diffuses into the aqueous medium. The effect, is more pronounced at current densities of 10 ma, or more and at these current densities, a carbon rod can break or snap or the surface can peel off as a skin. In the embodiment of FIG. 2, the positive carbon electrode is covered with a hydrophilic water permeable membrane to prevent these effects from happening. Referring to FIG. 2, the negative electrode is formed of a perforated pipe 8 of stainless steel which is integral with a nonperforated pipe 9 also of stainless steel. The positive electrode 1 is formed from a bar of carbon and is covered over the liquid contacting section thereof with a hydrophilic water-permeable membrane 10. A rubber cap 11 is disposed on the lower end of the positive electrode 1 to prevent it from contacting with the negative electrode. The upper parts of the positive and negative electrodes are separated from each other by a rubber ring 12 to prevent contact between them. A waterproof cap 4 is provided to prevent water from contacting the electrical connections to the electrodes. The carbon bar does not react electrolytically over the area in the rubber ring 12. For this reason, the waterproof effect of cap 4 is not influenced, even when the carbon bar gets thinner over that part contacting the liquid because of its reaction with oxygen to form carbon dioxide during electrolysis. Dissolved carbon dioxide generated at the positive electrode flows outwardly through the plurality of openings 13 of the performed stainless steel pipe 8. At the same time, hydrogen gas generated in the stainless pipe is discharged through the same openings 13. This avoids a build up of hydrogen gas inside the stainless steel tube. The positive carbon electrode is covered with a hydrophilic water-permeable membrane 10 to prevent carbon powder formed during hydrolysis from dropping and diffusing in the liquid medium surrounding the electrodes. The hydrophilic water-permeable membrane 10 is fixed on the carbon bar 1 with a rubber band (or a thermally shrunk tube) 14. For the hydrophilic water permeable membrane, porous membranes can be used, such as a dialyzing membrane, a filter membrane or cloth. A suitable pore size of the porous membrane should be chosen in relation to the particle size of the carbon powder.

Figure 3:
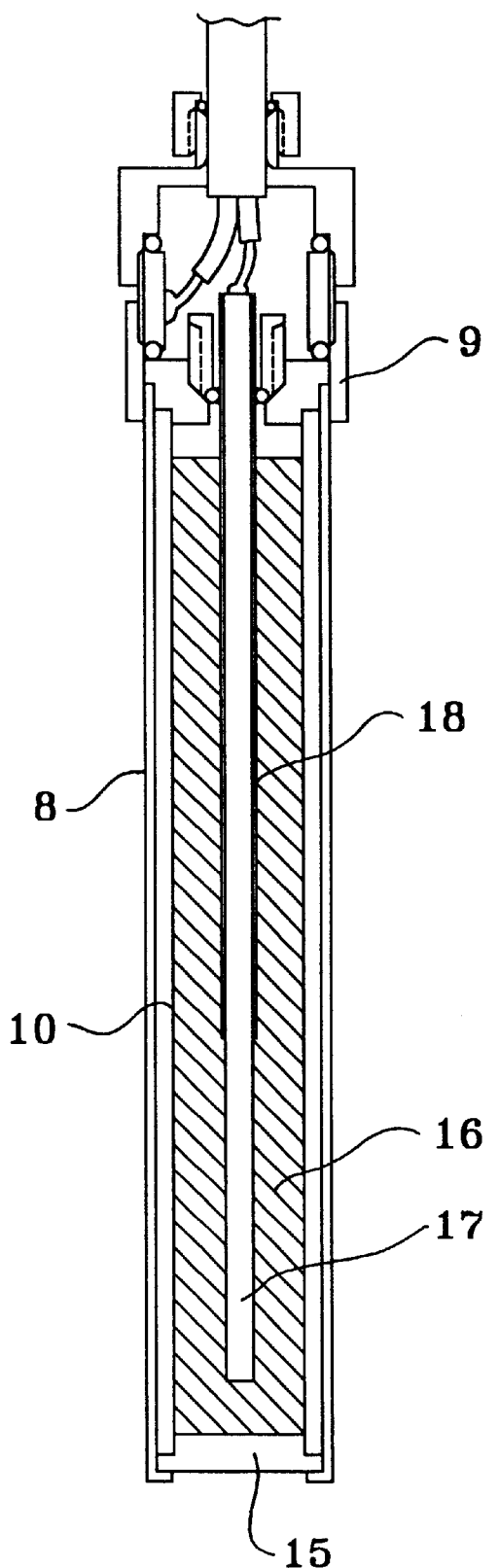
FIG. 3 shows a cross sectional view of Example 3 of the invention.

FIG. 3 is a schematic cross section of a further embodiment of the present invention.

In the embodiment illustrated in FIGS. 1 and 2, a bar of carbon is used as the positive electrode. Powder or granules of carbon having a size of 2 mm or below may also be used. This is illustrated in FIG. 3. A bag is formed by adhesively attaching a plug 15 to the lower end of the tube of a hydrophilic water-permeable membrane 10, such as a hydrophilically modified porous membrane of polyvinyl chloride, which is then charged with carbon powder or granules 16 and an electric collector 17 (for a positive electrode) is inserted into the powder or granules. An insulator 18 covers the upper half of the electric collector 17. The insulator 18 is provided so that as the carbon particles or granules are used up by their reaction with oxygen and their volume decreases and the level of particles or granules drops down to the bottom of the bag, the electric collector 17, is not immediately exposed to the aqueous medium permeating through the membrane 10. If the electric collector 17 is directly exposed to the aqueous medium, oxygen gas is produced. If carbon is used for the electric collector 17, it needs to be made of a material which is resistant to positive oxidation. The electric collector may be any other electrically conducting material which is resistant to positive oxidation, for example, a noble metal such as platinum or a titanium rod coated with platinum. The carbon powder or granules used here preferably have a size of 2 mm or below in order to provide a large contacting area with the electric collector 17. Powder or granules of carbon during the positive oxidation break down to even finer pieces. For this reason, the hydrophilic water permeable membrane preferably has a pore size of 5 microns or below. Activated carbon, glassy carbon and graphite may be used in the form of carbon powder or granules. In FIGS. 1, 2 and 3, connecting leads and seals are conventional.

What is claimed is:

1. A method of supplying dissolved carbon dioxide to plants in an aqueous medium comprising the steps of providing at least two electrodes in the aqueous medium, wherein at least one of the electrodes is made of particulate or granulated carbon; supplying an electric current to the electrodes such that the carbon electrode functions as an anode; providing an electric collector that is in electrical contact with said anode; regulating the current density supplied to the electrodes so that no, or substantially no, oxygen gas is formed at the carbon anode; reacting the carbon anode with nascent oxygen generated at the anode to form carbon dioxide; dissolving the carbon dioxide in said aqueous medium.

2. A method as claimed in claim 1, characterized in that the aqueous medium is disposed in an aquatic tank containing underwater aquatic plants.

3. A method as claimed in claim 1, in which the aqueous medium is a cell culture medium and the pH of the medium is controlled by controlling the rate of supply of dissolved carbon dioxide to the culture medium.

4. A method as claimed in claim 1, characterized in that the electrolysis is effected intermittently or continuously to maintain the desired level of dissolved carbon dioxide in the aqueous medium.

5. A method as claimed in claim 1, characterized in that the carbon electrode is covered by a hydrophilic water-permeable cover.

6. A method as claimed in claim 5, characterized in that the hydrophilic water-permeable cover is a dialyzing membrane, a filter membrane or is composed of cloth.

7. A method as claimed in claim 1, characterized in that the carbon electrode is made of carbon black and said current density is 6 mA per sq. cm of electrode surface.

8. A method as claimed in claim 1, wherein substantially all of the oxygen generated at the carbon anode reacts with the carbon electrode.

* * * * *